Jan. 15, 1952  R. S. TICE  2,582,364
SOIL CONDITIONER
Filed Oct. 21, 1946  2 SHEETS—SHEET 1
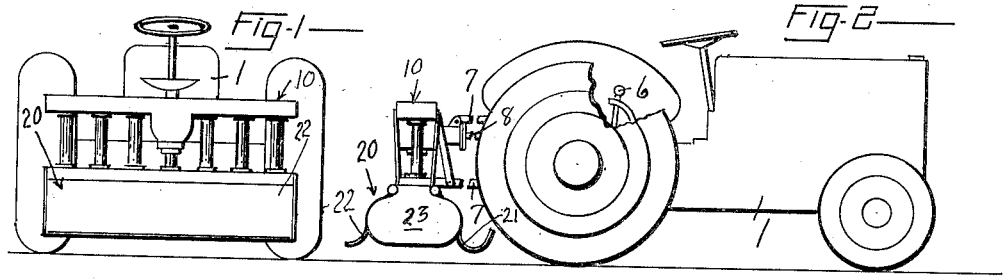
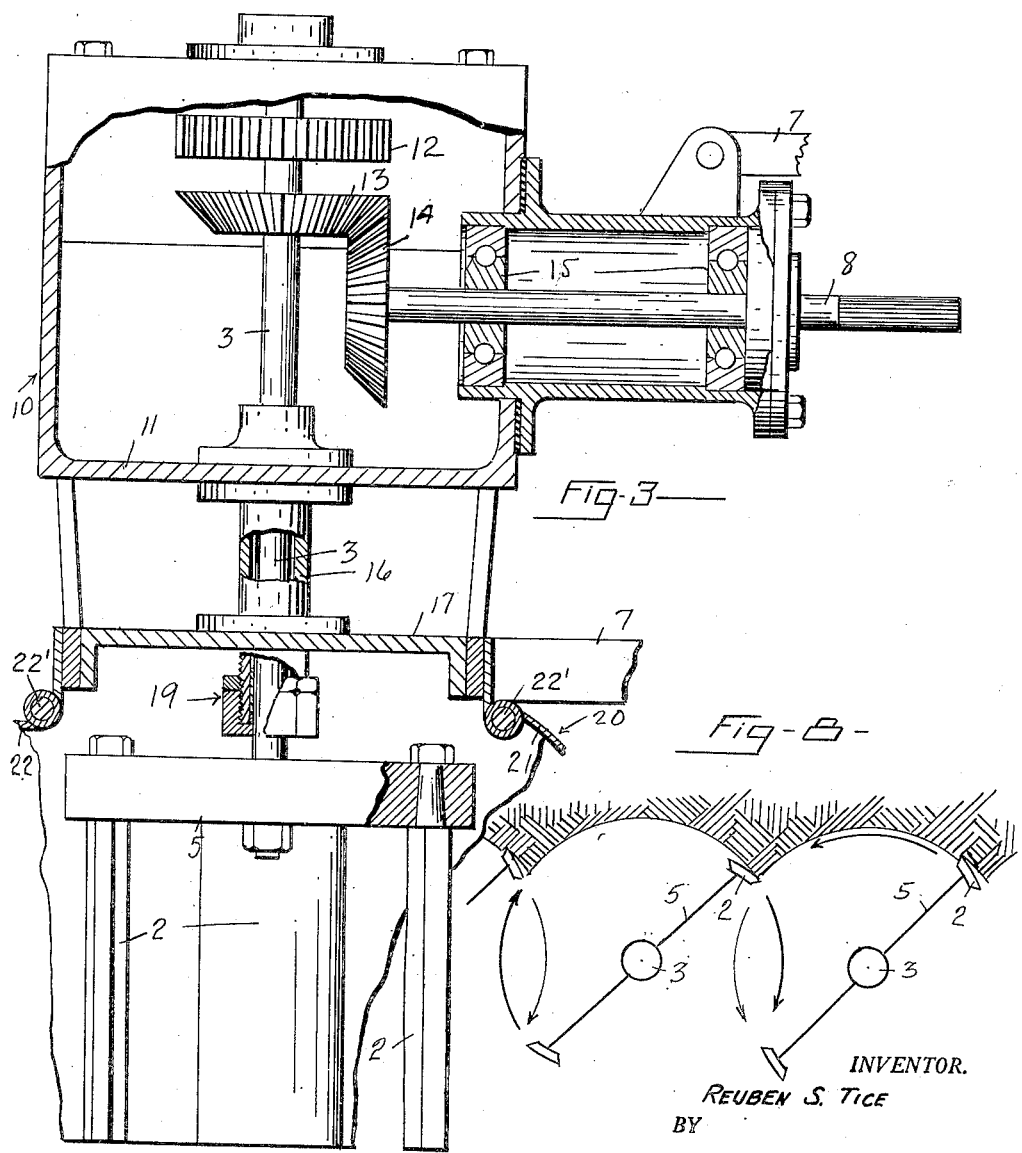
INVENTOR.
REUBEN S. TICE
BY
Boyken, Mohler & Beckley
ATTORNEYS Jan. 15, 1952     R. S. TICE     2,582,364
SOIL CONDITIONER
Filed Oct. 21, 1946     2 SHEETS—SHEET 2
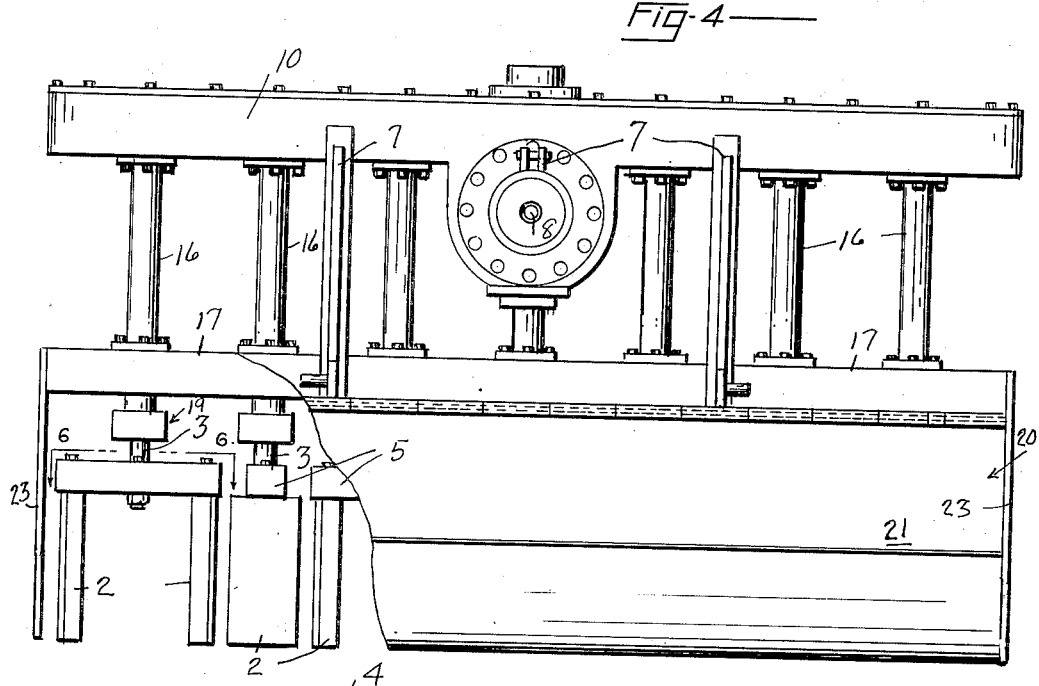
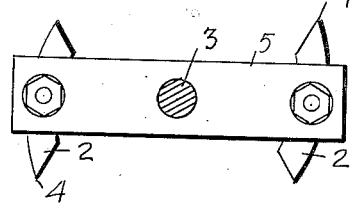
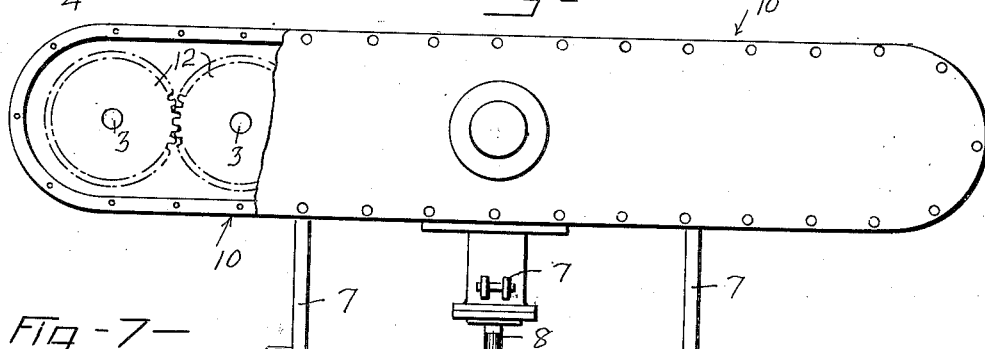
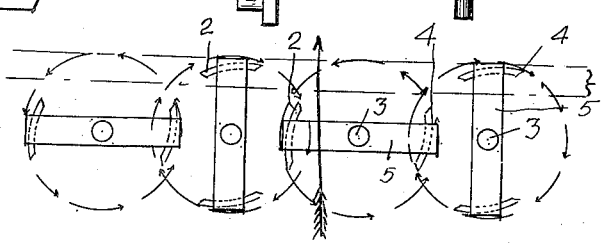
INVENTOR.
REUBEN S. TICE
BY
Boyken, Mohler & Beckley
ATTORNEYS Patented Jan. 15, 1952

2,582,364

UNITED STATES PATENT OFFICE 2,582,364

SOIL CONDITIONER

Reuben S. Tice, Monterey County, Calif.

Application October 21, 1946, Serial No. 704,688

2 Claims. (Cl. 97—43)

This invention relates to a soil conditioner and mechanical sterilizer. The term "mechanical sterilizer" refers to a device that is adapted to kill insect life including larvae, above a certain size. The most injurious insects found in the ground are those that are substantially longer than one thirty-second of an inch, and these are usually larvae. Wire worms, cut worms and many other forms of insect life detrimental to crops are found in the soil at a relatively high level or close to the surface. Many thousands of acres in some of the most fertile lands have been rendered totally unfit for production of crops due to infestation by some of these insects. The use of poison has not been generally successful, and the expense is extremely high. It is an object of this invention to provide a machine that is adapted to destroy the detrimental worms, etc. by cutting them and at the same time to condition the soil for planting.

Another object of the invention is a method of destroying detrimental insects in the ground by cutting or by cutting and impact in some cases.

A still further object of the invention is the provision of a machine that is adapted to rapidly and cleanly cut up the soil in continuous relatively wide swaths by vertically extending blades rotatable about vertical axes, and to deposit the soil so cut in the close vicinity of such swaths.

Heretofore, cutting blades rotatable about horizontal axes have been relatively common, particularly where soil that has produced a crop of asparagus is to be reconditioned for a new crop, but the use of such cutters, rooters or conditioners have not been found to be satisfactory for exterminating the larvae and insects, whereas by spraying the cutting blades vertically and rotating them about vertical axes and so that the adjacent blades revolve in overlapping paths, a very effective extermination of insects and their larvae is accomplished where such insects and larvae have a substantial size of from about a sixty-fourth of an inch upwardly.

Other objects and advantages will appear in the description and in the drawings.

In the drawings,

Fig. 1 shows a device illustrative of the invention carried at the rear end of a tractor.

Fig. 2 is a side elevational view of the device of Fig. 1 showing the soil conditioner device elevated out of the ground.

Fig. 3 is an enlarged part elevational and part sectional view taken vertically through the conditioner unit.

Fig. 4 is a front view of the conditioner unit, partly broken away.

Fig. 5 is a top plan view of the unit of Fig. 4.

Fig. 6 is an enlarged sectional view taken along the line 6—6 of Fig. 4.

Fig. 7 is a semi-diagrammatic top view of a plurality of the blades showing their paths of travel.

Fig. 8 is a diagrammatic view showing the general contour of the cut effected by the conditioner and the position of adjacent cutters at one point in the operation.

In detail, the invention as illustrated in the drawings comprises a vehicle 1 adapted to move over the ground, and which vehicle carries the soil conditioner device that includes a plurality of pairs of vertically extending cutting blades 2 having vertically extending cutting edges 4 (Fig. 6).

Each pair of blades 2 is carried at the lower end of a vertical shaft 3, (Fig. 3). A cross member 5 may carry one of the blades of each pair at each end of such member, and each cross member is secured to the lower end of each shaft 3 centrally of such member. The shafts 3 are arranged in a horizontal row extending transversely of the direction of travel of the vehicle and the blades 2 depend from the ends of members 5.

In the drawing the vehicle 1 carries the power plant for rotating shafts 3 which results in revolving the blades. This vehicle is illustrated as being a conventional tractor having the usual power take-off at its rear end, and a conventional "Ferguson system" hitch for supporting the conditioning device in place of disks, plows, cultivator blades, etc., that the hitch usually supports for raising and lowering relative to the ground. The usual lever 6 (Fig. 2) is positioned adjacent the operator for effecting the raising and lowering of the conditioner, and members 7 of the hitch are connected with the conditioner.

The power take-off shaft extending from the tractor engine is connected by any suitable drive connection with the shaft 8 (Figs. 1, 3 of the conditioner).

Any suitable source of power may be employed, and the conditioner may be on a trailer and driven by a power plant independently of the tractor engine if desired. The most important things are that the conditioner is provided with means for connecting it with a source of power and that the blades are adapted to be revolved at a relatively high rate of speed, say from about 3 to 6 hundred revolutions per minute while the conditioner is supported for movement over the ground with the blades extending from say about 3 to 16 inches into ground. The drawing shows one means for accomplishing these results.

Referring specifically to the conditioner, a horizontally extending, horizontally elongated, oil-tight housing 10 extends longitudinally of the row of shafts 3, said shafts extending upwardly into said housing through the lower side 11 (Fig. 3) of the latter.

The upper ends of shafts 3 are connected for simultaneous rotation about their axes by gears 12 (Figs. 3, 5) there being one gear secured to each shaft, and the teeth of the several gears being in mesh.

While any desired number of shafts 3 may be used, there are seven shown in the drawing, and the central shaft in the row has a bevel gear 13 (Fig. 3) secured to its upper end within housing 10. This bevel gear 13 is in driving connection with a bevel gear 14, the latter being secured on the shaft 8. Shaft 8 is supported for rotation by bearings 15, and said shaft projects from the bearings and housing for connection with the power take-off of the motor.

Shafts 3 rotatably extend through the bottom 11 of housing 10 and downwardly through tubular members 16 coaxial therewith, said members being secured to the lower side 11 of the housing at their upper ends and to a metal channel strip or the like 17 at their lower ends. Bearings and an oil tight cap 19 may provide an oil seal at the lower ends of the tubular members 16 respectively through which said shafts 3 project for securement to the cross members 5.

As best seen in Figs. 4, 6, the blades 2 are vertically elongated and accurately curved in horizontal contour with the cutting edge 4 of each blade spaced radially outwardly of the axis of the shaft 3 that carries each pair of blades than the trailing edge. Thus there is no objectionable frictional drag on the blade or on the trailing edge during the simultaneous revolution of the blades and their bodily forward motion.

Blades 2 may be any desired length, but it has been found that from 10 to 19 inches is satisfactory, and they may be lowered into the ground to any desired depth, although the depth should not be greater than the effective length of the cutting edge.

The blades on adjacent shafts 3 are so arranged that their paths of travel will overlap, as best indicated in Fig. 7. The degree of overlap is sufficient to enable the blades on one shaft to safely clear the blades on the adjacent shaft during their simultaneous revolution about the axis of said shafts, and their directions of revolution are opposite. Thus the horizontal contour of the progressively cut face of the soil will be generally as indicated in Fig. 8 and the major portion of the cut of each blade will be transversely of the direction of travel of the blades bodily.

By setting the blades on the adjacent shafts in planes extending at right angles to each other, it will be seen that about half of the blades will always be cutting into the soil ahead of the conditioner, while the overlapping paths of travel of the blades will insure against any possibility of any of the soil being missed at any point in the row of blades. In fact, the overlapping paths of travel has been found to subject the soil to several cutting operations before the soil is finally behind the blades, and these cutting operations are the same for insects, larvae, and anything that is in the soil to the depth of the blades 2.

The rate of revolution of the blades relative to the rate of forward movement of the tractor or conditioner is such that each successive cut by each blade will be about 1/64 of an inch, whereby any insect or larvae, etc., in the soil will be effectively destroyed.

The row of blades 2 is effectively enclosed in a hood 20 that preferably comprises the strip 17 as the top, and front and rear walls 21, 22 extending longitudinally of strip 17 and hinged to the latter at 22' to permit said walls to follow the contour of the ground ahead of and behind the blades.

The front wall 21 is preferably curved upwardly at its lower end so that the said lower end will ride over the ground like the leading ends of sleigh runners, while the rear wall 21 will drag.

The ends of housing 20 preferably comprise parallel, blade-like shoes 23 that may extend to the depth of the blades, and that will cut through the ground.

This housing 20 is essential for keeping the soil closely adjacent the cutting face and to reduce the dust that would otherwise be prohibitive in volume. Also, said housing walls form impact surfaces that will destroy insects that are hurled against it by the blades.

In actual practice, the soil conditioner may be drawn through the same soil several times, and the soil is preferably first plowed, disked or harrowed to a degree that will enable the blades to perform their work without injury to them. It is obvious that the soil itself will be broken up by the conditioner to an unusually fine degree, obviating any necessity for further harrowing.

The gear housing 10 is preferably filled with oil so that lubrication of the rapidly rotating gears and shifts is effected.

It is to be understood that the detailed description and drawings are not to be considered restrictive of the invention, but merely illustrative of one form thereof. For example, the invention is adapted for use as a road scarifier, in which the outer end portions of the blades do the work, and when the device is used in the field it not only conditions the soil relative to insects and hard clods, but it enables fertilizer to be worked into the conditioned soil to the proper depth to avoid hot spots in the soil. The blades can obviously be made heavier, or lighter, and longer or shorter for special types of work.

I claim:

1. A soil conditioner and mechanical sterilizer comprising a vehicle adapted for movement over the ground in one direction, a horizontal, row of horizontally spaced vertical shafts supported on said vehicle for rotation about vertical axes, a pair of horizontally spaced vertically extending blades secured to the lower end of each of said shafts in positions extending downwardly therefrom, means for rotating said shafts about their axes, means supporting said shafts for said rotation with said blades extending into the ground, and a hood extending over and around said blades and substantially in engagement with the surface of said ground to retain the soil cut by said blades in close proximity to the latter said hood having forward and rear side walls relative to the direction of travel of said vehicle supported for vertical movement independently of each other and said blades.

2. A soil conditioner and mechanical sterilizer comprising a vehicle adapted for movement over the ground, a horizontal row of horizontally spaced vertical shafts supported on said vehicle for rotation about vertical axes, a pair of horizontally spaced vertically extending blades secured to the lower end of each of said shafts in positions extending downwardly therefrom, means for rotating said shafts about their axes, means supporting said shafts for said rotation with said blades extending into the ground, and means extending over and around said blades and substantially in engagement with the surface of said ground to retain the soil cut by said blades in close proximity to the latter, said last mentioned means including runners at the ends of said row adapted to be supported on the ground for movement thereover and walls extending longitudinally of said row along the forward and rear sides of said blades relative to the normal forward movement of said vehicle over the ground.

REUBEN S. TICE.

REFERENCES CITED

The following references are of record in the file of this patent:

UNITED STATES PATENTS

| Number | Name | Date |
| --- | --- | --- |
| 75,310 | Standish | Mar. 10, 1868 |
| 1,090,383 | Cantrell et al. | Mar. 17, 1914 |
| 1,276,843 | Wentworth | Aug. 27, 1918 |
| 1,592,825 | Gardner et al. | July 20, 1926 |
| 2,366,386 | Clark | Jan. 2, 1945 |
| 2,394,771 | Hill | Feb. 12, 1946 |
| 2,424,520 | Tonkin | July 22, 1947 |

FOREIGN PATENTS

| Number | Country | Date |
| --- | --- | --- |
| 458,501 | Germany | Apr. 10, 1928 |